United States Patent [19]
Condit et al.

[11] Patent Number: 5,919,853
[45] Date of Patent: Jul. 6, 1999

[54] METHOD AND COMPOSITIONS FOR LASER IMPRINTING AND ARTICLES IMPRINTED USING SUCH METHODS AND COMPOSITION

[75] Inventors: David A. Condit, Avon; Daniel J. Budnik, Cheshire, both of Conn.

[73] Assignee: Otis Elevator Company, Farmington, Conn.

[21] Appl. No.: 08/895,313

[22] Filed: Jul. 16, 1997

Related U.S. Application Data

[63] Continuation-in-part of application No. 08/594,053, Jan. 30, 1996, abandoned.

[51] Int. Cl.$^6$ ....................................... C08K 3/00
[52] U.S. Cl. ..................... 524/413; 524/430; 524/431; 524/492; 524/495
[58] Field of Search .................... 524/413, 430, 524/431, 492, 493, 495, 496

[56] References Cited

U.S. PATENT DOCUMENTS

| | | |
|---|---|---|
| 4,578,318 | 3/1986 | Schoch et al. .......................... 428/615 |
| 5,239,158 | 8/1993 | Locklear, et al. ....................... 219/121 |

FOREIGN PATENT DOCUMENTS

| | | |
|---|---|---|
| 0415674A2 | 3/1991 | European Pat. Off. . |
| 0627330A1 | 12/1994 | European Pat. Off. . |
| 0644234A1 | 3/1995 | European Pat. Off. . |
| 2744066 | 8/1997 | France . |
| 01241500 | 9/1989 | Japan . |
| 1229243 | 4/1971 | United Kingdom . |
| WO9205967 | 4/1992 | WIPO . |
| WO9744203 | 11/1997 | WIPO . |

OTHER PUBLICATIONS

PCT Search Report for Serial No. PCT/US98/14473 dated Oct. 7, 1998.

French Search Report for Serial No. 9700752 dated Apr. 7, 1998.

*Primary Examiner*—Edward J. Cain

[57] ABSTRACT

A method of imprinting a workpiece includes lasing the workpiece to create a depression or other opening, depositing a laser-fusible polymer material into the depression, and then lasing the material so as to fuse the material into the depression. Preferably, the laser-fusible polymer material is fusible in the near infrared spectrum. An alternate method for imprinting using colored powder paints includes an additional step of heating the workpiece to ensure thermosetting of the colored powder paint. Laser fusible materials having particular physical characteristics and compositions may be used to facilitate the process.

19 Claims, 5 Drawing Sheets

METHOD AND COMPOSITIONS FOR LASER IMPRINTING AND ARTICLES IMPRINTED USING SUCH METHODS AND COMPOSITION

This application is a continuation-in-part of application Ser. No. 08/594,053 Jan. 30, 1996, abandoned.

BACKGROUND OF THE INVENTION

1. Technical Field

The present invention relates to marking articles or other workpieces and, more particularly, to methods of laser marking or laser imprinting a workpiece, and to the resultant article produced thereby and to compositions used therein.

2. Description of the Prior Art

Transferring text and graphics to metal, plastic, wood or composite pieces is commonly done by mechanical engraving (followed by a paint fill) or surface painting.

Mechanical engraving into, for example, a metal article followed by paint fill is often a tedious multi-step process. Typically, the article (i) is mechanically engraved using a hard tool engraving system, (ii) is deburred, cleaned, and dried, (iii) is filled with a solvent-based or a powdered paint, (iv) is cured in an oven and, (v) then is cleaned to remove excess paint deposited outside of engraved areas.

A majority of mechanical engraving systems are limited to engraving flat surfaces. Furthermore, strength limitations on mechanical cutters limit their minimum diameter and, hence, their stroke width. In many cases, metals, particularly high nickel-chromium alloy steels, require slow processing speeds with the assistance of cutting fluids. The use of these fluids requires a cleanup operation prior to painting. The paint filling process can be quite difficult, particularly with intricate graphics. Placement of the paint at this stage is very important because misplacement or overfilling will require a substantial cleanup effort after the paint has been oven cured. Some metals, such as a mirror finish stainless steel or brass, scratch quite easily; thus, special care must be taken not to damage these surfaces during paint filling and cleanup operations.

Although time consuming, mechanically engraved text and graphics have durability and permanence. When filled with colored paint, the final product is long lasting and aesthetically pleasing.

Surface painting involves transferring text and graphics onto workpiece surfaces using silk-screen or ink jet techniques. Surface painting can be done fairly quickly and in a full range of colors.

One type of surface painting uses dry powder paint. Typically, powdered paint is given an electrical charge, which attracts the powdered paint to the surface of the article to be painted. The physical properties and chemical composition of the powder paint are specifically designed for the particular process used to fuse the paint to the surface. One such process involves entraining powdered polymer in an air stream and passing it through a corona discharge plasma. This process uses commercially available powder paint having relatively large particle sizes, on the order of 10–86 $\mu$m. However, in many cases, the present inventors believe that a lack of durability or permanence required for long term wear, such as for elevator cab interior markings, constitutes a significant drawback to surface painting. This process is not commonly used to transfer text and graphics onto workpiece surfaces.

Another process, used in conventional copying machines, formulates the toner, e.g. a polymer powder, with various charge transfer agents. Small particle size (approximately 7–10 $\mu$m) is required in this process to facilitate the flow of powder paint from a hopper, to a charged developer roller, then to a second drum coated with photoreceptor, and lastly onto the paper. Fusion of the toner to paper is accomplished using a hot roller. An alternative method to fix toner to paper is known as flash fusion and uses xenon lamps to heat and fuse the toner onto the paper. The lamps produce a strong emission intensity from approximately 800–1100 nm, which readily fuses black toners since they have strong absorption in this near infrared region. For color toners, however, an absorption additive, such as diammonium salt that absorbs in the 800–1100 nm region, is used to facilitate fusion.

More recently, laser engraving and laser marking techniques have been developed as alternatives to both mechanical engraving and surface painting of materials, such as metals, plastics, composites or wood. Conventional laser engraving systems utilize, for example, either a Nd-YAG or a $CO_2$ laser. A galvanometer driven motor arrangement or an X-Y gantry arrangement steers a focused laser beam over a workpiece surface.

Laser engraving systems work well as versatile engraving tools, particularly for intricate engraving because of their fine stroke width (0.003"–0.010"), and for engraving into moderately contoured surfaces. Because laser engraving is a non-contact process (method), problems associated with mechanical engraving such as tool wear and resharpening, tool breakage, cutting coolants and part fixturing are eliminated. Furthermore, relatively rapid part engraving is possible with known laser engraving systems. However, even with the known laser engraving systems, there is a significant limitation to engraving depth into dense materials such as stainless steel or brass. Edge definition is degraded increasingly with depth because of a build-up of, for example, remelted metal. A minimum depth of approximately ($\pm 10\%$) 0.010" is required for subsequent paint filling. This requires having to deburr and to clean the engraved areas prior to any paint filling. Even more difficult than for conventional mechanical engraving is the paint filling operation after laser engraving, which operation includes an application of paint, a curing of the paint, and a removal of excess paint, all without damaging the finished surfaces. Powdered paint, as opposed to a liquid paint, is easier to employ, but typically, the overall paint filling operation is an intricate, multi-step process.

As an alternative to surface painting or to engraving (mechanical or laser) combined with paint filling, there is laser marking. Such marking is dependent upon a contrast produced at a point at which the laser beam strikes or impinges upon the material surface. To achieve a good contrast, the laser power can be optimized to produce dark brown or black oxides on shiny metal surfaces or to remove colored oxides or paint from pretreated panels to expose a lighter contrasting substrate. For many applications, laser marking works well. However, as with silk screening or ink jet printing techniques, the limited durability or limited permanence of the mark effectively excludes use of known laser marking techniques for applications such as use for elevator cab interior markings, because those markings are often subjected to extensive abrasive contact with, e.g., elevator passengers' hands. Furthermore, the lack of contrast which results when obliquely viewing surface markings on shiny metals seems to the present inventors to pose an additional shortcoming of known laser marking techniques for elevator system applications. For a discussion of some known laser marking systems and techniques, see, for example, *Industrial Strength Laser Marking: Turning Pho-*

*tons into Dollars*, published by Control Laser Corporation, Orlando, Fla. (1992), which publication is hereby incorporated in its entirety by reference.

DISCLOSURE OF INVENTION

The present inventors believe that improvements over known laser marking techniques are achievable. The method according to the present invention is used to imprint text and graphics into many types of materials including metals, plastics, composites or woods. The inventive method yields a durability and permanence typically associated with mechanical engraving, and provides a speed, contrast and color flexibility normally associated with surface painting techniques. The laser imprinting process of the present invention utilizes a modified (as discussed below) conventional laser marking system first as a shallow engraving tool, and then as a focused thermal source to fuse a fine powdered fill material (e.g., a suitable polymer material) into the previously engraved areas. For example, a polyester or epoxy fill material is used. The extremely localized heating and curing of the fill material by means of laser energy eliminates the tedious application, oven cure time, and post clean up associated with conventional mechanical and laser engraving processes which are followed by a liquid paint fill. Thus, workpiece processing time according to the inventive method is significantly reduced and the ability to produce permanent aesthetically pleasing markings is enhanced. Finally, the present inventors believe that the inventive method reduces substantially any hazardous waste by eliminating all process fluids and paint solvents associated with known marking processes previously described.

According to a preferred embodiment of the present invention, a method of imprinting a workpiece includes providing a workpiece, lasing the workpiece to create a depression, depositing a laser-fusible material into the depression, and then lasing the material so as to fix the material into the depression.

According to an alternate embodiment of the present invention, the method further includes a step of heating the workpiece to re-melt, gel and cure the fill material in the depression. This alternate embodiment is particularly advantageous for powder paints due to the relatively short thermal exposure realized by the powder during the lasing or fusing step. Such short thermal exposure may not be sufficient for powder paints since they have larger particle sizes as compared to toners. The additional heating step ensures a smooth, glossy finish and completes the cure in order to ensure thermosetting of the powder paint.

According to the present invention, the powder paint used in the process is a composition formed from particles having particle sizes of less than or equal to 45 μm. This particle size facilitates the fusion of the powder paints using either $CO_2$ or Nd-YAG lasers, and also facilitates complete filling of the powder paints into the depressions formed by the laser engraving.

According to an alternate embodiment, the powder paint includes infrared absorbers that absorb energy at short infrared (IR) wavelengths and promote fusing of the powder paint within the depression. This embodiment is particularly advantageous for using colored powder paints with Nd-YAG lasers, since the short wavelength energy produced by such lasers may not couple sufficiently with colored powder paints to cause melting or fusion.

It is a principal object of the present invention to imprint a workpiece in an efficient manner.

It is an additional object of the present invention to produce a workpiece having imprints with enhanced durability and permanence.

It is a further object of the present invention to utilize laser emitted (radiated) energy for creating a depression in a workpiece, and also for fusing a colored fill material into the workpiece.

It is a still further object of the present invention to provide a laser-fusible chemical composition for the fill material.

It is a still additional object of the present invention to reduce the creation of hazardous waste during laser imprinting of a workpiece.

Further and still other objects of the present invention will become more readily apparent when the following detailed description is taken in conjunction with the accompanying drawing, in which:

DETAILED DESCRIPTION OF AND BEST MODE FOR CARRYING OUT THE INVENTION

Figure 1:
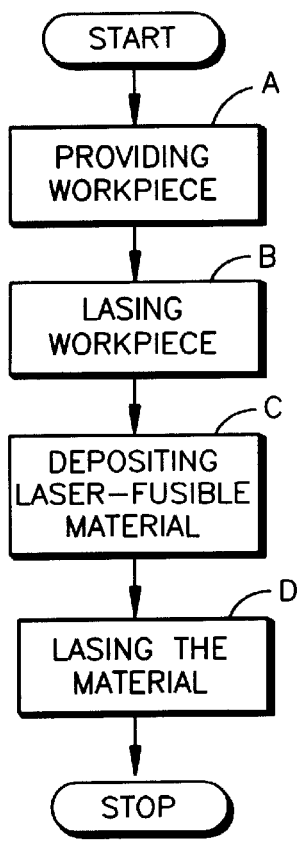
FIG. 1 is a high level logic flow diagram of a preferred method according to the present invention.

A preferred method according to the present invention is shown in FIG. 1 (steps A–D), and in the workpiece (W) perspective views shown in FIGS. 2A–2D.

A computer controlled laser engraves a graphic or a text into the workpiece W. The workpiece is, for example, formed of a metal, plastic, wood or composite, and is disposed on a table 14. See steps A and B of FIG. 1, FIGS. 2A, 2B and FIG. 3. A shallow depth (e.g., 1–5 mils) of the engraving is determined by the permanence required of the mark or imprint in the material. The morphology or surface roughness of the engraved area is tailored to provide a suitable "bed" for a subsequent polymer fusion. For example, an engraved channel C (FIG. 2B) or other depression is crosshatched (not shown) in order to provide an additional holding area to be filled by a polymer material P which is fixed as a layer L into the channel C during the fusion step D. Alternatively, the laser beam is controlled in the step B to pit (not shown) the engraved surface to enable the formation of polymer roots (not shown), to provide a more secure anchoring of the fused polymer material.

Figure 2A:
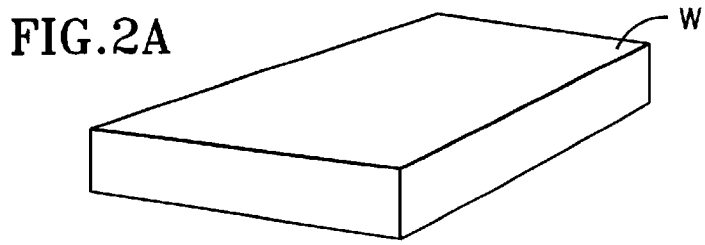
FIGS. 2A, 2B, 2C and 2D are perspective views of a workpiece W (FIG. 2A), the workpiece W having a depression or channel C (FIG. 2B), an amount or thin layer of a laser-fusible fill material P disposed into the channel C (FIG. 2C), and a layer L formed by laser fusing the fill material P into the channel (FIG. 2D).
Figure 2B:
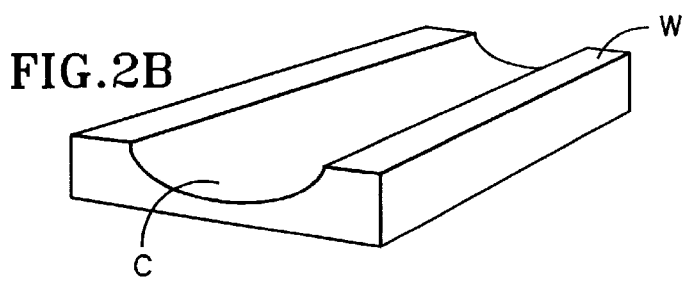
Figure 2C:
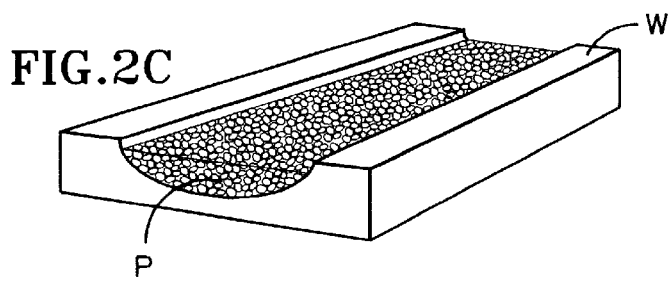
Figure 2D:
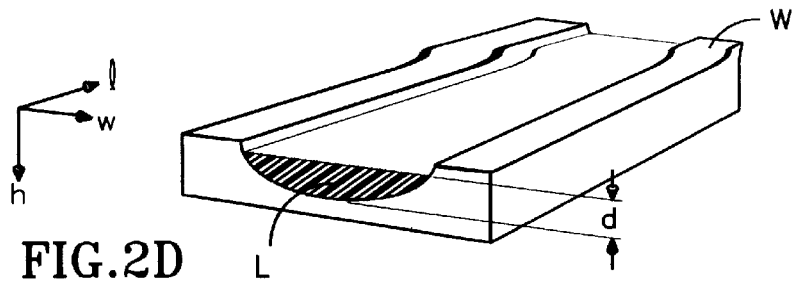

In the step C, a thin layer of laser-fusible polymer material (e.g., powder paint) P is placed or disposed into the text or graphic which has been engraved in the step B. The powder is placed manually, but may be deposited automatically by means of a distribution system 18. The black or other colored polymer powder P is formulated to fuse through absorption of, e.g., near infrared laser (Nd-YAG) light energy having a wavelength of, for example, approximately $1\times10^{-6}$m. Each granule of the powder has a diameter of, e.g., approximately less than $10\times10^{-6}$m, and the thin layer of polymer powder P has an average depth of, e.g., 3 mils. The laser beam is controlled to retrace the engraved text or graphic, with the laser parameters set to fuse the powdered polymer into the engraved text or graphic (step D). The extremely localized energy of the laser beam fuses the powdered polymer only within the engraved areas. Such fusing results in a creation of the fused polymer layer L (FIG. 2D). Optionally, after completion of the first retracing, another layer of the polymer powder P is added to the previously fused polymer material and the steps C and D are repeated. This procedure is continued until a desired depth d of fused material is contained within the engraved graphic or text area. See FIG. 2D. One preferred black polymer powder has the following chemical composition:

Minor portion marketed by Xerox Corporation as Xerox 5760/65/90 toner.
Polyester, $R_1$—$[R_2\ COO]_n R_3$
Carbon Black, C
Titanium Dioxide, $TiO_2$ Major portion marketed by Oasis Imaging Products as Oasis Sierra EX toner. Styrene Acrylic Polymer, $R_1$—$[CH_2CH_2(C_6H_5)]_x$—$[CH_2CH(COOR_2)]_y$—$R_3$
Iron Oxide, $Fe_3O_4$
Polyolefin, $R_1$—$[CH_2CHR_2]_n$—$R_3$
Silica, $SiO_2$ In one preferred embodiment of the powder P, the composition includes a mixture of the Xerox 5760/65/90 toner as a minor component and of the Sierra EX toner as a major component. Preferably, the minor component is 5%–20% by weight of the entire mixture. The former toner produces a high-gloss finish, while the latter toner produces a semi-gloss finish. Therefore, as the percentage of the Xerox toner increases, so does the degree of the gloss finish.

After all the desired text and/or graphics have been laser imprinted, any excess unfused polymer powder is removed (e.g., brushed or vacuumed off—not shown) prior to removal of the finished article. The total time to produce a finished workpiece (article), depending on the intricacy of the imprinting, takes on the order of minutes for the present invention as compared typically to hours required for conventional engraving techniques.

A further preferred embodiment of the method according to the present invention includes, for example, the followings steps 1–9:

1. Placing the workpiece W to be imprinted into the laser imprinting system (FIG. 3).
2. Setting the laser power supply 10 parameters and laser beam travel speed, such that engraving of the text depressions and graphics depressions into the workpiece is accomplished. Optionally, effecting multiple laser passes in order to achieve an engrave depth as dictated by the application requirements.
3. Setting the laser power supply 10 parameters and the laser beam travel speed to effect a cleaning action (e.g., deburring) of the engraved area. Effecting a cleaning pass over the engraved areas. This cleaning operation removes excess recast material (e.g., metal) from the engraved areas.
4. Setting the laser power supply 10 parameters and the laser beam travel speed to create the desired surface morphology in the engraved areas. Effecting a surface preparation pass over the engraved areas. The surface morphology or roughness is set to provide a desired "rooting" of the laser-fusible fill material.
5. Treating the engraved areas on the workpiece with a high pressure (approximately, e.g., 75 psi) of a dried compressed gas or other fluid (e.g., air or an inert gas such as nitrogen) in order to remove loose material from the engraved areas. Loose material may affect undesirably the adherence of the fill material into the engraved areas.
6. Depositing (e.g., spreading) a fine layer of fill material over the engraved areas using, e.g., the polymer application unit (polymer distribution system, FIG. 3 and FIG. 4).
7. Setting the laser power supply 10 parameters and the laser beam travel speed so as to fuse the colorizing fill material. Effecting a fusing pass over the engraved areas.
8. Optionally, repeating steps 6, and 7, above until a desired thickness/depth d of the fill has been achieved.
9. After the completion of fusing, removing (e.g., brushing or vacuuming off) the excess fill material from the workpiece for reclamation. Thereafter, rinsing the workpiece with water or other appropriate fluid, and then drying the workpiece (e.g., by wiping off the fluid). The workpiece imprinting method of the further preferred embodiment is complete.

Figure 3:
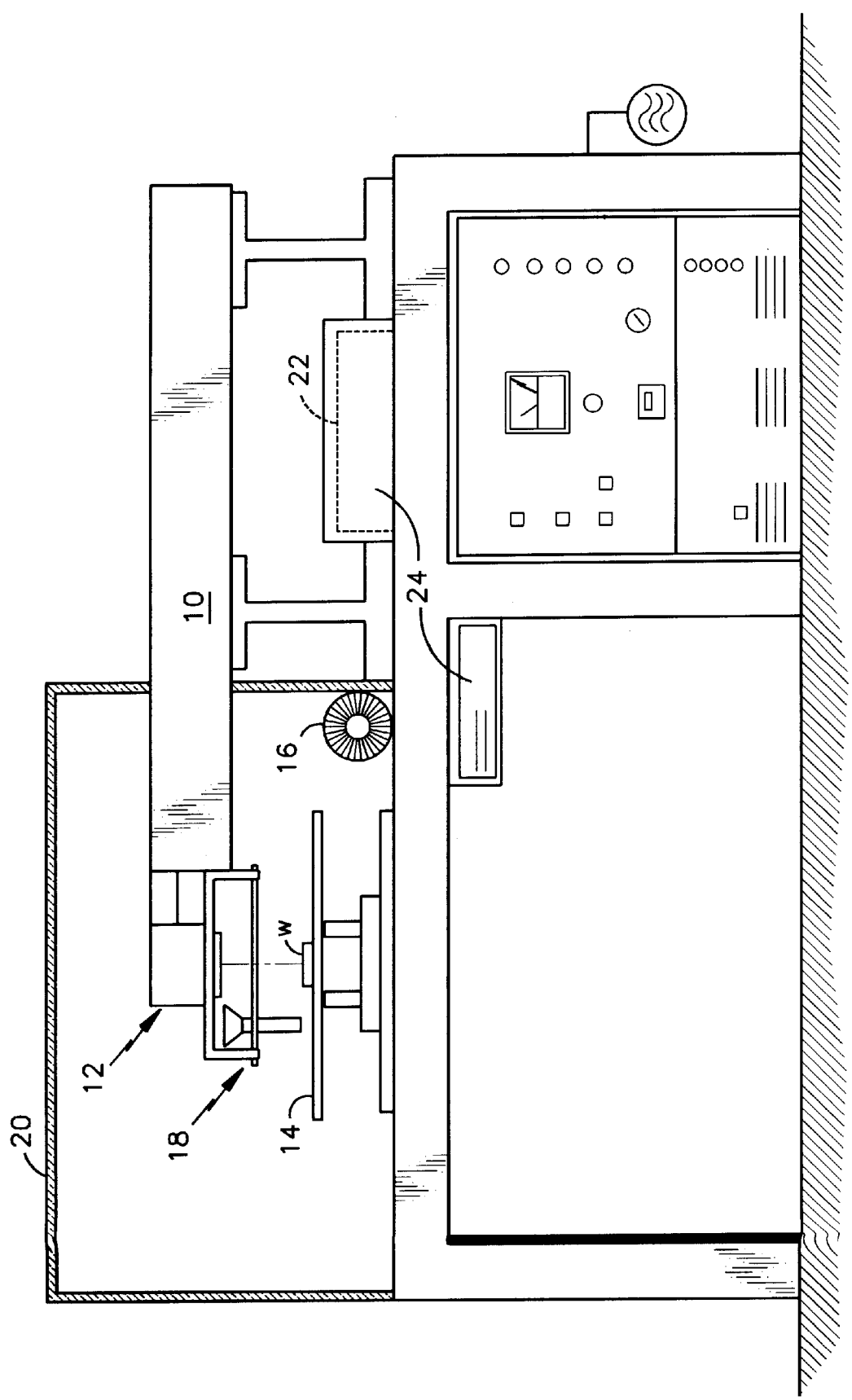
FIG. 3 is a schematic block diagram of a conventional laser marking system which has been modified to include a Fill Material Distribution System according to one preferred aspect of the present invention.
Figure 4A:
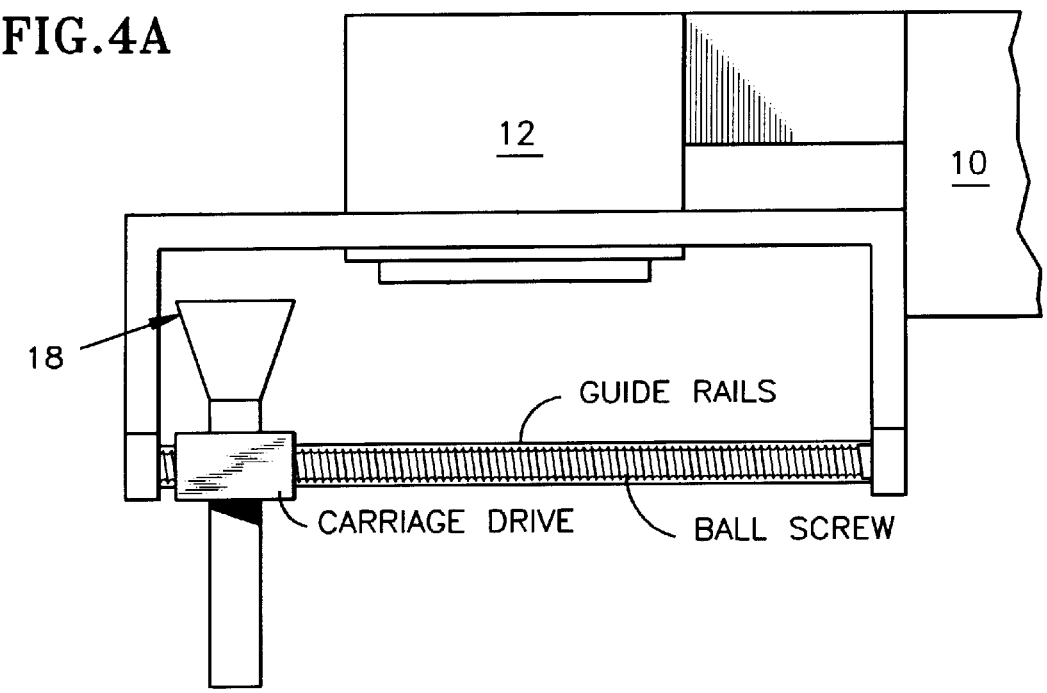
FIG. 4A is a side view and FIG. 4B is a top view of the Fill Material Distribution System of FIG. 3.
Figure 4B:
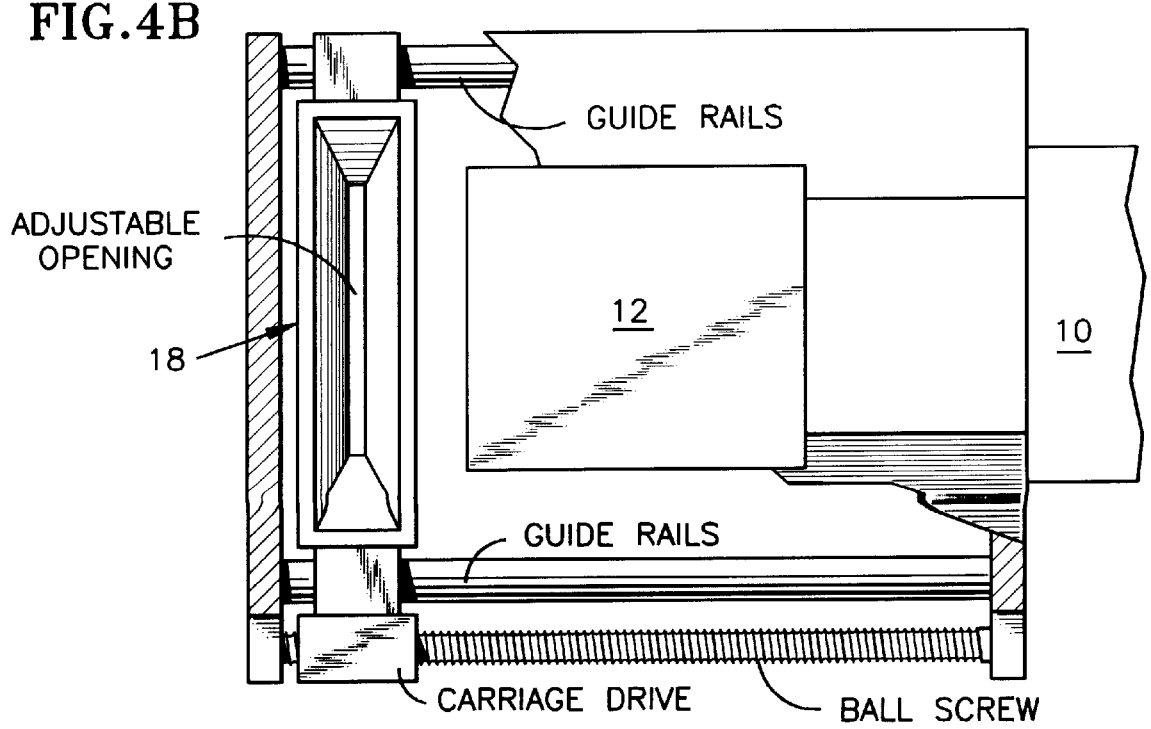

Components of a preferred laser imprinting system to practice the preferred, or further preferred, method of the present invention are shown in FIG. 3.

10. Computer controlled Nd-YAG or $CO_2$ laser power source. The specific parameters of the power source (i.e. average power, peak power, pulse frequency, laser beam output mode(s), focused spot size) are chosen in order to provide the desired processing characteristics in the workpiece and in the fill material.
12. Computer controlled laser beam steering apparatus:
    12.1 Galvanometer-driven X and Y beam steering mirrors, with laser beam focusing through a flat field lens system.
    12.2 X-Y gantry style moving mirror optical elements.
    12.3 Fixed laser beam delivery optics, with workpiece motion via a computer controlled X-Y table 14.
14. Computer controlled X-Y Table for workpiece manipulation.
16. Computer controlled fume extraction system for vaporized material and fume removal during processing.
18. Computer controlled polymer distribution system
20. Enclosure for fume containment and laser safety.
22. Operator interface and application software for imprinter operation including, for example, software to effect the steps B, C and D of FIG. 1. Such software is suitably stored in a conventional fashion in the memory of the Control Computer 24.
24. Control Computer including CPU, memory (RAM, ROM, etc.), I/O ports, buses, controllers, input devices (e.g., keyboard, mouse) and output devices (e.g., display, printer).

Those skilled in the computer and laser marking art in view of this disclosure can suitably code and store the software, and any other appropriate computer instructions and data into a memory of the computer 24 so as to appropriately control the laser beam, table, fume extraction system and fill material distribution system to effect all steps 1–9, and to otherwise implement the present invention. For example, a polymer (fill material) distribution system (FIGS. 4, 3) is readily constructed, and can be integrated with a Hi-Mark 400 YAG Laser Marking System manufactured and sold by General Scanning, Inc. The System is then suitably programmed in a straightforward manner to effect any or all steps of the present invention, but particularly to effect the step D (FIG. 1) which fixes the fill material into the depression by a chemical bonding and/or a physical attachment resulting from lasing the fill material.

The present inventors have found that the following laser parameters (beam power, beam travel speed, etc.) were particularly useful when imprinting a stainless steel workpiece with a fusible polymer material having the composition previously described:

To Engrave: 23 watts, 15 khz pulse rate; 240 mm/sec beam travel speed;

To Fuse: 0.1 watt, 50 khz pulse rate; 240 mm/sec beam travel speed; which created a depression having a depth of approximately three (3) mils.

The depth of the unfused fill material P was approximately three (3) mils.

Figure 5:
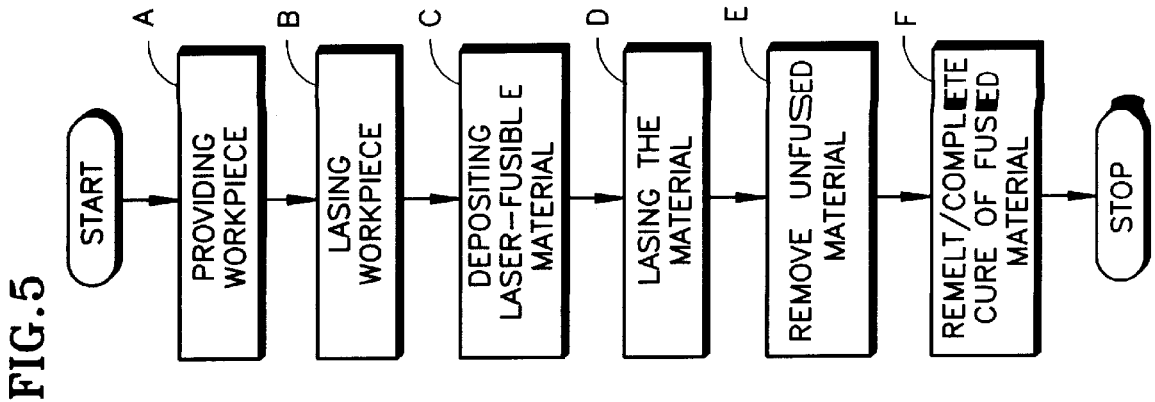
FIG. 5 is a high level logic flow diagram of a method for laser imprinting using colored powder paints.

An alternate method for laser imprinting is illustrated in the functional block diagram of FIG. 5. This method includes steps A–D as shown in FIG. 1 and discussed above, but also includes two additional steps E and F.

Step E encompasses removal of the excess, unfused material from the workpiece after lasing of the workpiece in step D. This is essentially the material that is outside of the depression created in step B. The removal may be performed by brushing, blowing or vacuuming the excess material from the workpiece.

In step F, the cleaned workpiece is then heated to a temperature sufficient to re-melt, gel and finally cure the fused material. This step ensures that the material used is sufficiently heated to form a thermoset material in order to improve the durability of the imprint.

The alternate method of FIG. 5 is especially useful when using colored powder paints as the laser fusible material. The first pass with the laser (step D) will melt the powder paint, but may not completely cure it. Powder paints typically have larger particle sizes than toner materials and therefore require longer interaction time to thermoset the material. The final step of heating (step F) ensures the permanence and durability of the imprinting.

In addition to the supplementary steps used with powder paints, the physical characteristics and composition of the powder paint is also significant. Particles size plays an important role. Powder paints typically have a broad particle size distribution from about 10–85 $\mu$m. For example, powder paints commercially available from Morton Powder Coatings typically report their powder paint to be 0–15% greater than 75 $\mu$m and 30–40% greater than 45 $\mu$m. The present inventors have found that powder paint with particle sizes less than 38 $\mu$m works better than the standard particle sizing with regard to the speed of the fusion and the ease of spreading/filling in laser engraved depressions prior to fusion. Further, applicants believe that powder paints having larger particle sizes may be used successfully, such as up to 45$\mu$m. A method to produce such powder paints includes a step of sieving the powder paint with a sieve that removes particles greater than the desired size. A limitation on minimizing the particle size is the reduction in the yield after the step of sieving the power paint.

The composition of the powder paint may also play a significant role, depending upon the particular type of laser chosen to fuse the powder paint into the depression. $CO_2$ lasers emit energy at 10.6 $\mu$m. The energy of the $CO_2$ laser, considered to be long wavelength IR, will couple sufficiently with conventional powder paints, such as epoxies or polyesters produced by Morton Powder Coatings, to cause melting or fusion, even if color powder paints are used.

If the workpiece is made of metal or ceramics, it is generally preferred to use an Nd-YAG laser to perform the engraving step. Nd-YAG lasers emit energy at 1.06 $\mu$m. The energy of the Nd-YAG laser, considered to be short wavelength IR, will not couple, or be sufficiently absorbed by, conventional colored powder paints to cause melting or fusion. Infrared absorption additives are added to conventional colored powder paint to be make them laser fusible using short wavelength IR lasers, such as Nd-YAG laser. Absorption additives include, for example, functionalized copper phthalocyanines available from Zeneca Specialties under the trade name Pro-Jet950NP and diammonium salts available from H. W. Sands Corp. under the trade name SDA6592. These infrared absorbers are added into conventional colored powder paint formulations and will absorb a sufficient amount of energy at 1.06 $\mu$m to cause melting or fusing of colored powder paint filled into engraved depressions created in metal workpieces with the Nd-YAG laser.

Figure 6:
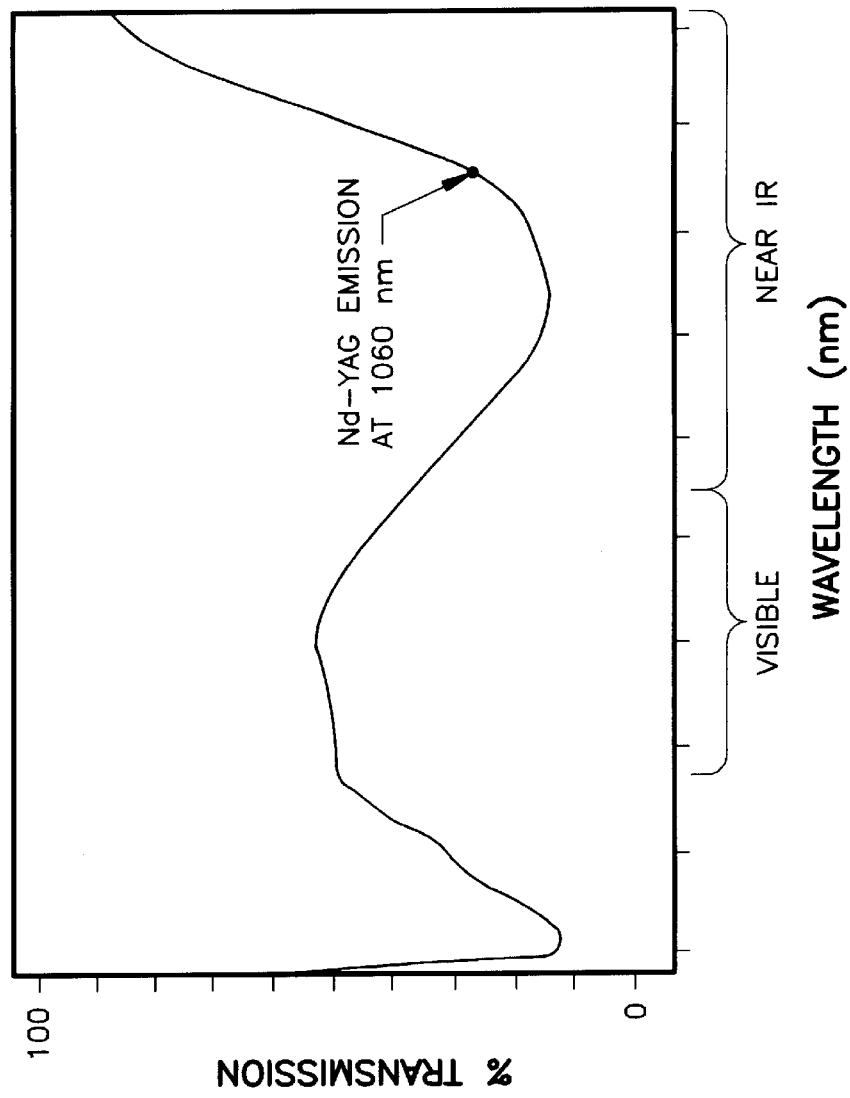
FIGS. 6 and 7 are representative reflectance spectrum for particular IR absorbing additives.
Figure 7:
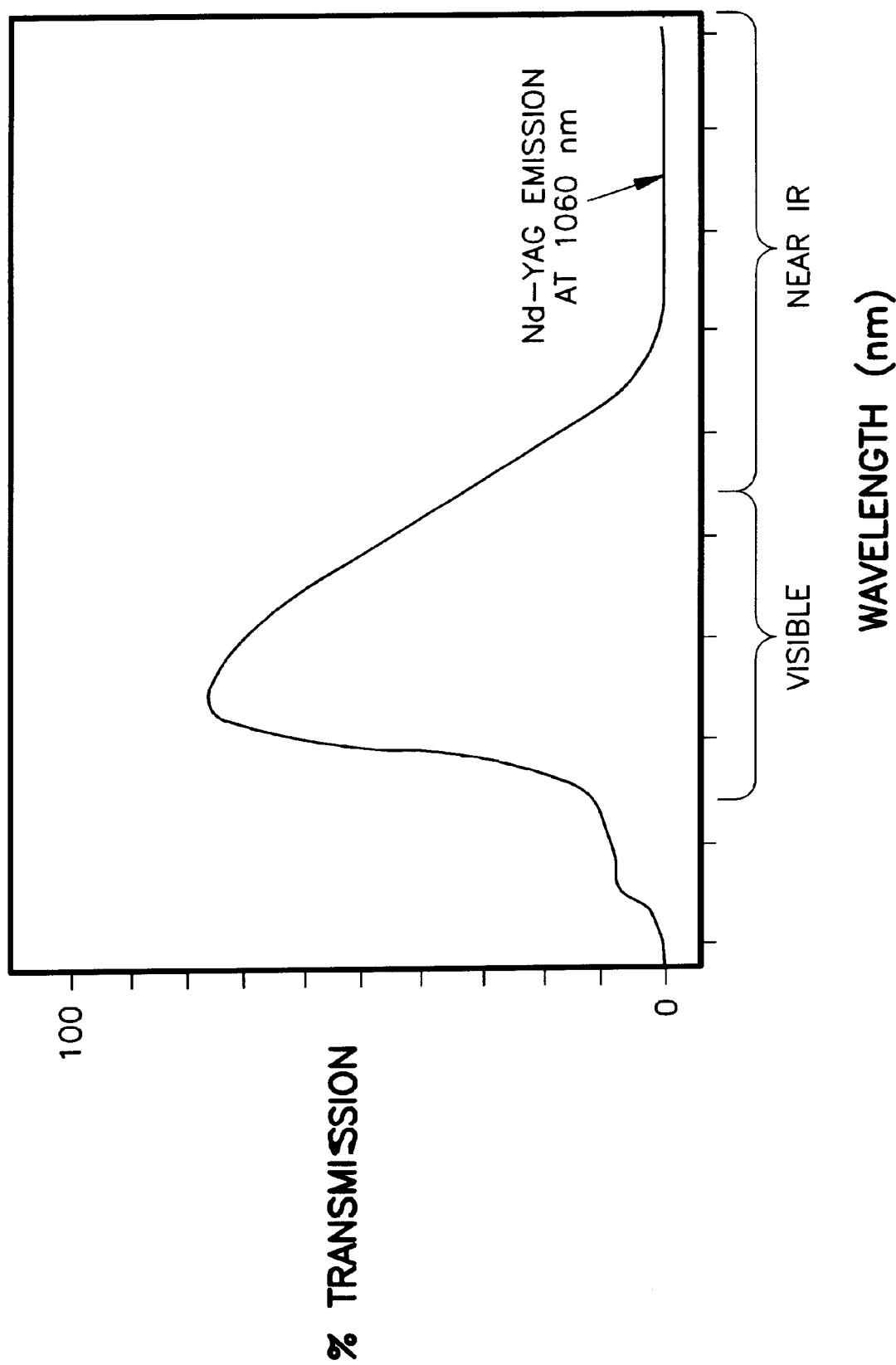

In addition to absorbing energy in the wavelength region at which the laser emits energy, it is also important that the selected additive also transmits energy in the visible spectrum to ensure that there is minimal interference with the visible color of the powder paint. Representative reflectance spectra for the suggested IR absorption additives are shown in FIGS. 6 and 7 for ProJet 950NP copper phthalocyanine and SDA6592 diammonium salt, respectively. As can be qualitatively seen in these two figures, both suggested additives absorb energy in the portion of the spectrum associated with Nd-YAG lasers. Therefore, they will generate thermal heating to melt or fuse powder paint particles. These additives also transmit a sufficient amount of energy in the visible spectrum.

Laser fusible colored powder paint is prepared by adding the IR absorbers described above into colored powder paint such as epoxy, polyester, or hybrid copolymers with polyester. Since the absorbers are intensely colored (dark green-black), it is important to use the minimum amount which will promote laser fusing of the powder paint without significantly compromising its color. For Pro-Jet 950 NP, which is thermally stable and therefore may affect the color, the suggested absorber to powder paint ratio is approximately 0.1%. For SDA 6592, which decomposes during lasing and curing and therefore has less impact on color, the suggested absorber to powder paint ratio is approximately 1%.

IR absorbers may be added to powder paint by a variety of methods, including hot melt, solvent or mixing methods. The method of choice depends on the chemical/thermal stability of the absorber with the polymer system. Hot melt involves mixing the absorber along with the other constituents in the powder paint together in a melted solution. A solid ribbon is then extruded from the melt which is then milled and sieved to the desired particle sizing. If the melting point of the absorber exceeds the temperature at which the powder paint polymerizes or gels (about 375° F. for conventional powder paints), the other solvent or mixing methods are preferred. The solvent method involves dissolving the absorber into a volatile solvent, adding the powder and then stripping off the solvent to produce a dry additized polymer which is then reground and sieved. The mixing method is a repetitive mixing, milling and regrinding process which concludes with a sieving process to yield the final particle size.

Other additives, besides the IR absorbers described above can be used to promote the melting or fusing of colored powder paint. The near IR, 1060 nm, wavelength emission of the Nd-YAG laser, which vaporizes metal during the laser engraving process, can be used to heat metal particles added to the powder paint. Two examples, submicron nickel powder and nickel-based superalloy powder smaller than 45 μm may added to a variety of colored epoxy and polyester powder paint. The powder paint fuses around the heated metal particles to produce an interconnected mass of larger fused particles in the engravings. After removal of the unfused material, post heating serves to remelt, flow, gel, and finally cure the fill material to produce a smooth continuous filling in the engraved areas.

Another suitable additive is finely dispersed carbon particles, which absorb at 1.06 μm, can be mixed in with colored powder paint. Since carbon is black, the powder paint colors become darkened as the carbon content increases. Thus, this type of additive may be limited to the production of other than bright vibrant colors.

The present invention offers several advantages over mechanical engraving regarding the variety of workpieces that can be marked. It is not limited to flat panels, rather it is particularly suitable for putting durable marks into shaped or contoured workpieces or articles. Contoured surfaces pose a problem for mechanical engraving when a uniform engraving depth is required. When a uniform depth is not a necessity, traversing the engraving tool through a variable depth of metal can cause tool damage and accelerate tool wear. For the laser engraving step of the imprinting process, the depth of focus for the laser optics overcomes these problems by being able to produce uniform engraving depths on contoured surfaces without tool wear. Examples of articles with contoured surfaces include convex and concave metal elevator call buttons and other cast aluminum, metal plated cast aluminum and injection molded metalized plastic fixtures.

Although the invention has been shown and described with respect to a best mode embodiment thereof, it should be understood by those skilled in the art that various other changes, omissions and additions in the form and detail thereof may be made therein without departing from the spirit and scope of the invention. For example, the fill material can be any suitable dry or even a suitable liquid paint; the laser source can include any suitable crystal, gas, glass, liquid or semiconductor as a laser medium.

What is claimed is:

1. A laser-fusible composition, comprising:
   a minor component which includes polyester, carbon black and titanium dioxide; and
   a major component which includes a styrene acrylic polymer, iron oxide, polyolefin and silica.

2. A composition as claimed in claim 1, wherein said minor component is in a range of approximately 5% to approximately 20% of said composition.

3. A composition is claimed in claim 1, wherein said composition is fusible in the near infrared spectrum.

4. A laser-fusible composition for imprinting workpieces, wherein the workpieces include a depression adapted to receive the composition for laser fusing the composition into the depression, the composition being a powder material having particle diameters less than a predetermined diameter, wherein the predetermined diameter is dependant upon the thermal exposure of the composition during laser fusing.

5. The laser-fusible composition as claimed in claim 4, wherein the particle diamters are less than or equal to 45 μm.

6. The laser-fusible composition as claimed in claim 4, wherein the particle diamters are less than or equal to 38 μm.

7. The laser-fusible composition as claimed in claim 4, further including an absorber material, wherein the absorber material enhances the energy absorption of the powder material during laser fusing.

8. The laser-fusible composition as claimed in claim 7, wherein the absorber material enhances the energy absorption of the powder material in the near infrared region.

9. A laser-fusible composition for imprinting workpieces, wherein the workpieces include a depression adapted to receive the composition for laser fusing the composition into the depression, the composition being a powder material including an absorber material, wherein the absorber material enhances the energy absorption of the powder material during laser fusing.

10. The laser-fusible composition as claimed in claim 9, wherein the absorber material enhances the energy absorption of the powder material in the near infrared region.

11. The laser-fusible composition as claimed in claim 10, wherein the absorber material includes copper phthalocyanine material.

12. The laser-fusible composition as claimed in claim 11, wherein the ratio of absorber material to powder material is 0.1% or less.

13. The laser-fusible composition as claimed in claim 10, wherein the absorber material includes diammonium salt material.

14. The laser-fusible composition as claimed in claim 11, wherein the ratio of absorber material to powder material is 1% or less.

15. The laser-fusible composition as claimed in claim 9, wherein the absorber material includes metal particles added to the powder material.

16. The laser-fusible composition as claimed in claim 15, wherein the absorber material includes submicron nickel powder.

17. The laser-fusible composition as claimed in claim 15, wherein the absorber material includes nickel-based superalloy powder.

18. The laser-fusible composition as claimed in claim 15, wherein the metal particles have a particle diameter of less than or equal to 45 μm.

19. The laser-fusible composition as claimed in claim 9, wherein the absorber material includes carbon particles added to the powder material.

* * * * *